May 30, 1961  K. H. HOEN  2,986,166
PRESSURE FLUID CONTROL SYSTEM
Filed Feb. 13, 1959  9 Sheets-Sheet 1
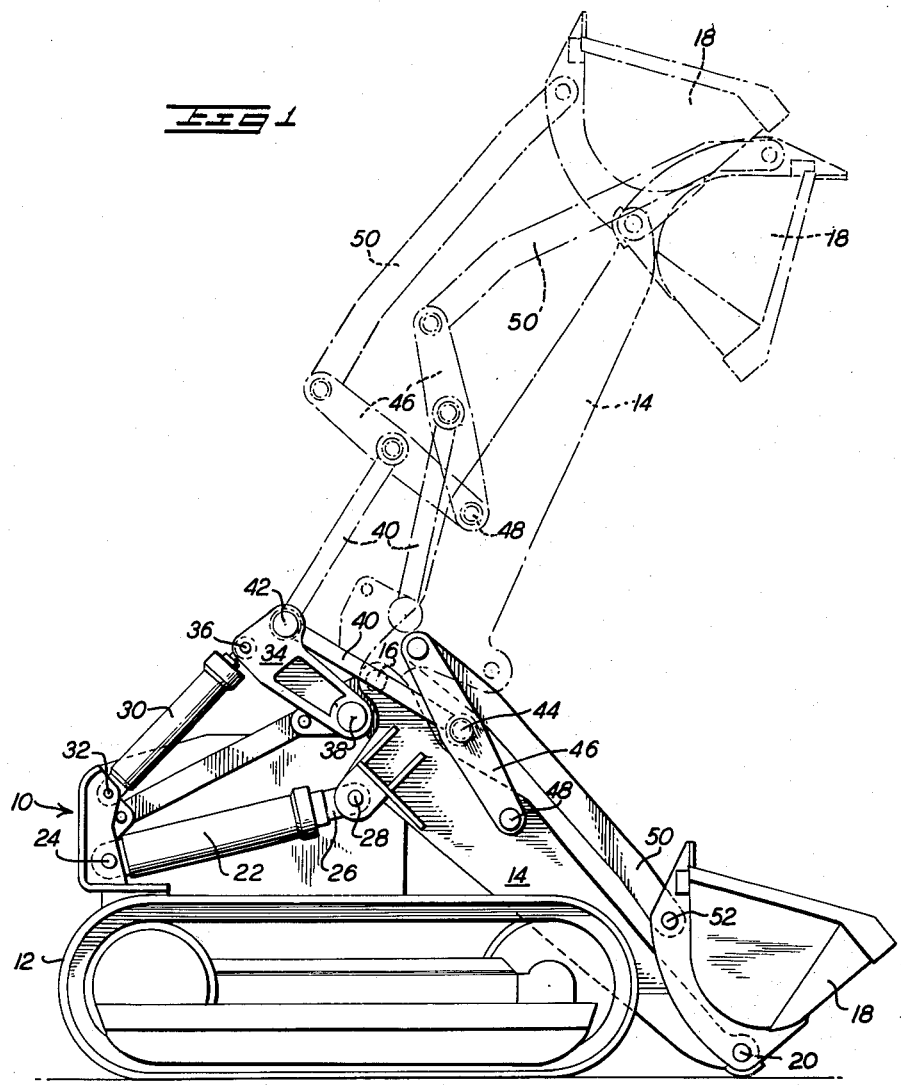
INVENTOR.
KENNETH H. HOEN
BY
ATTORNEYS

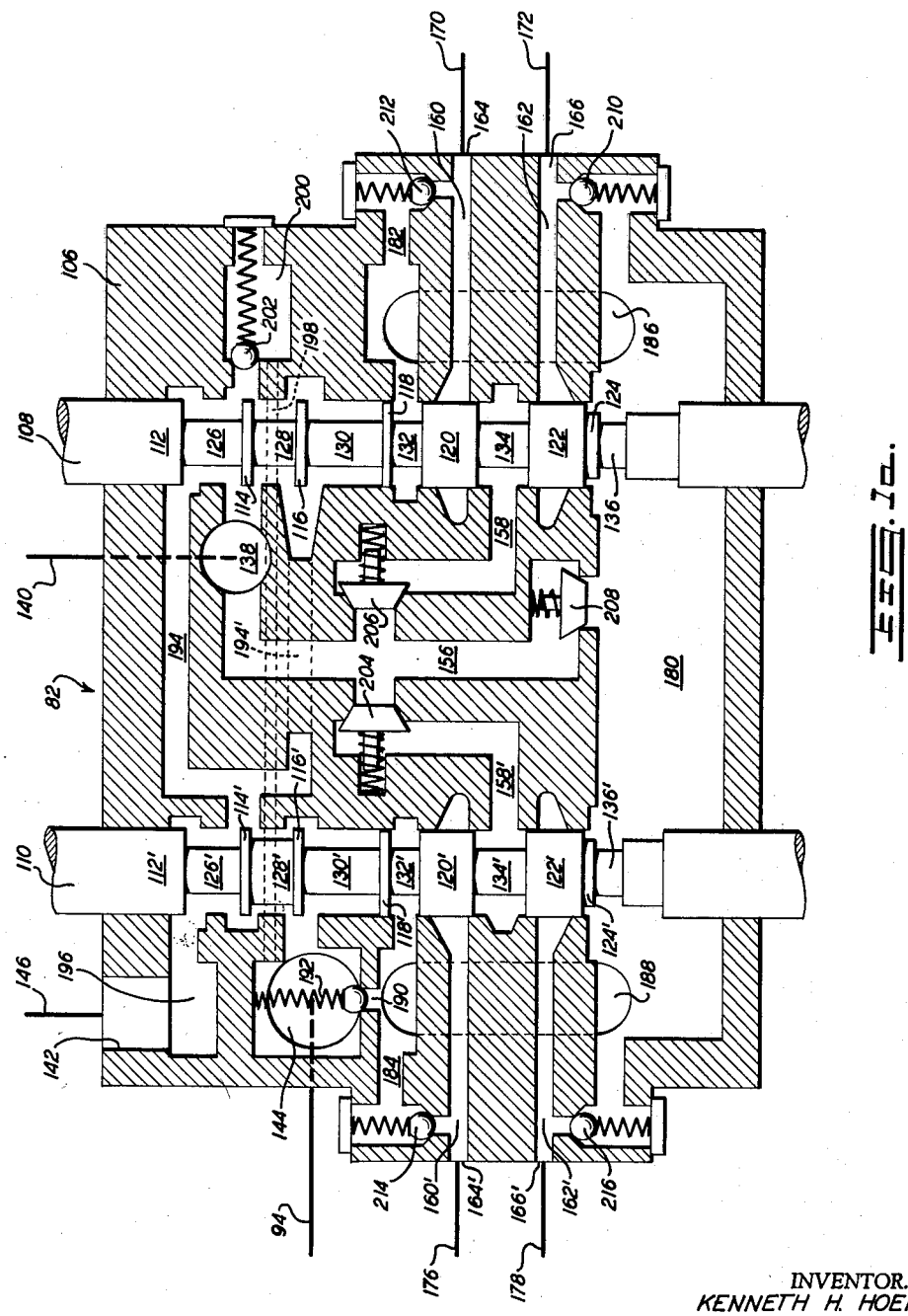

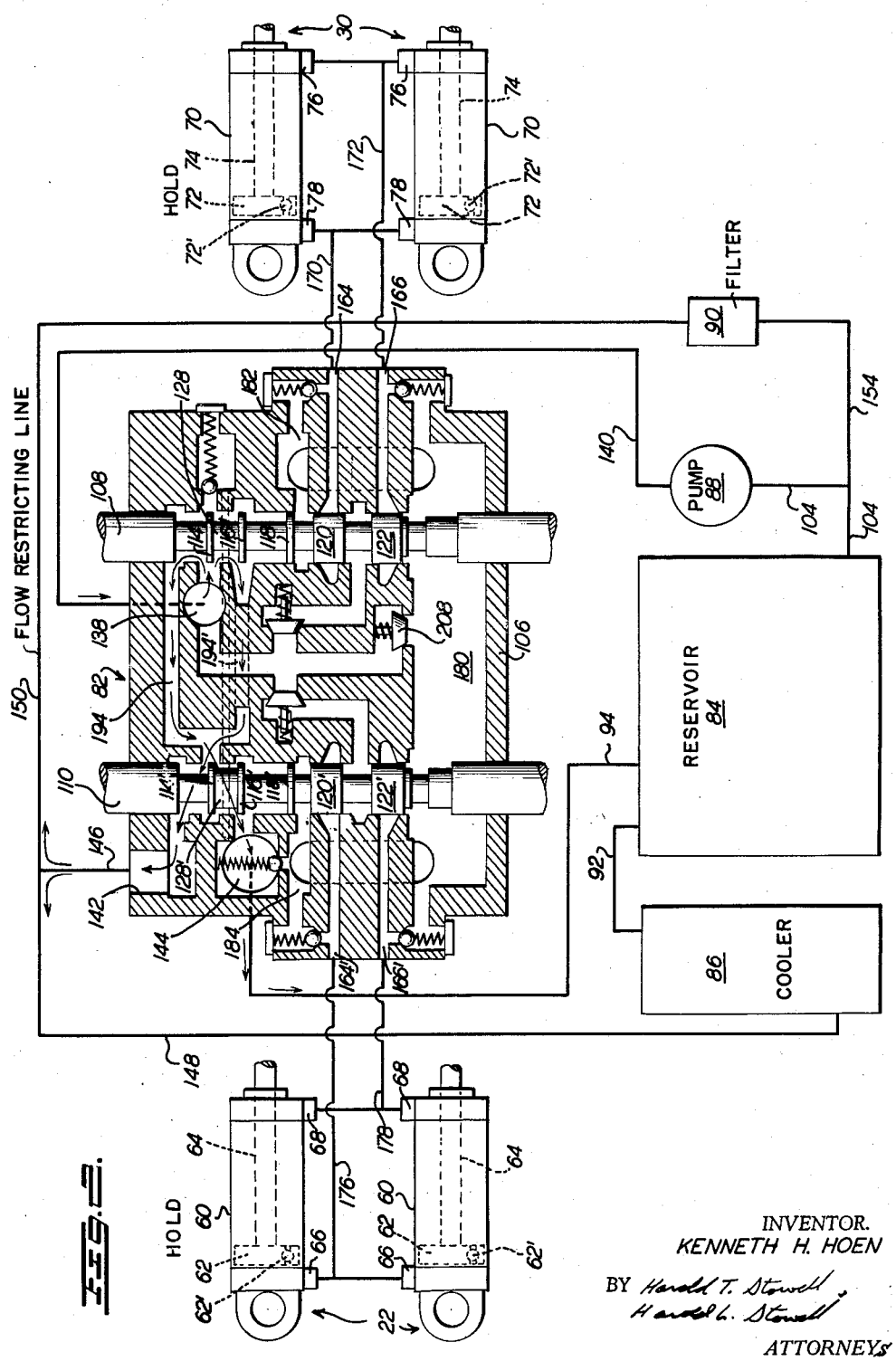

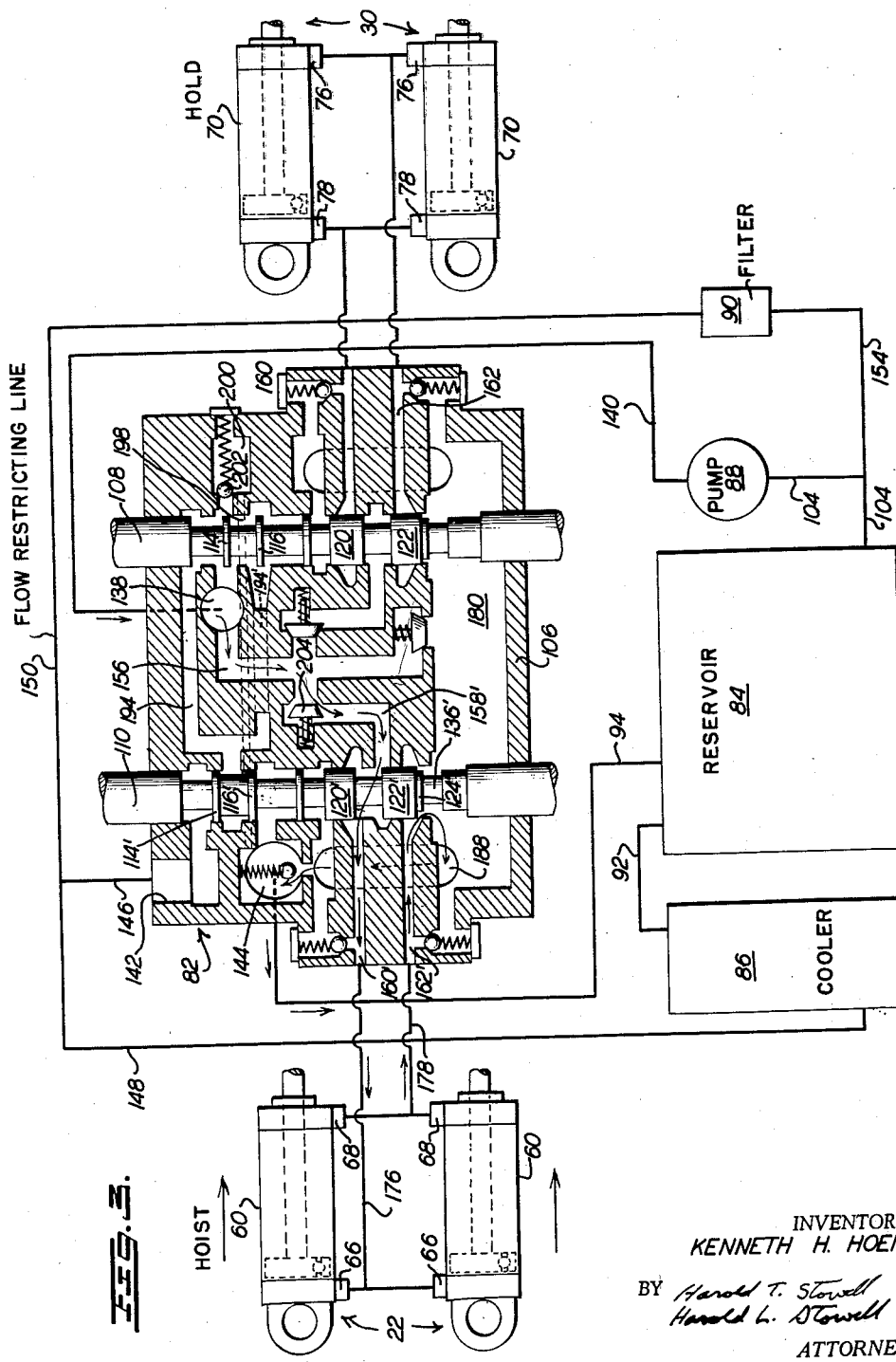

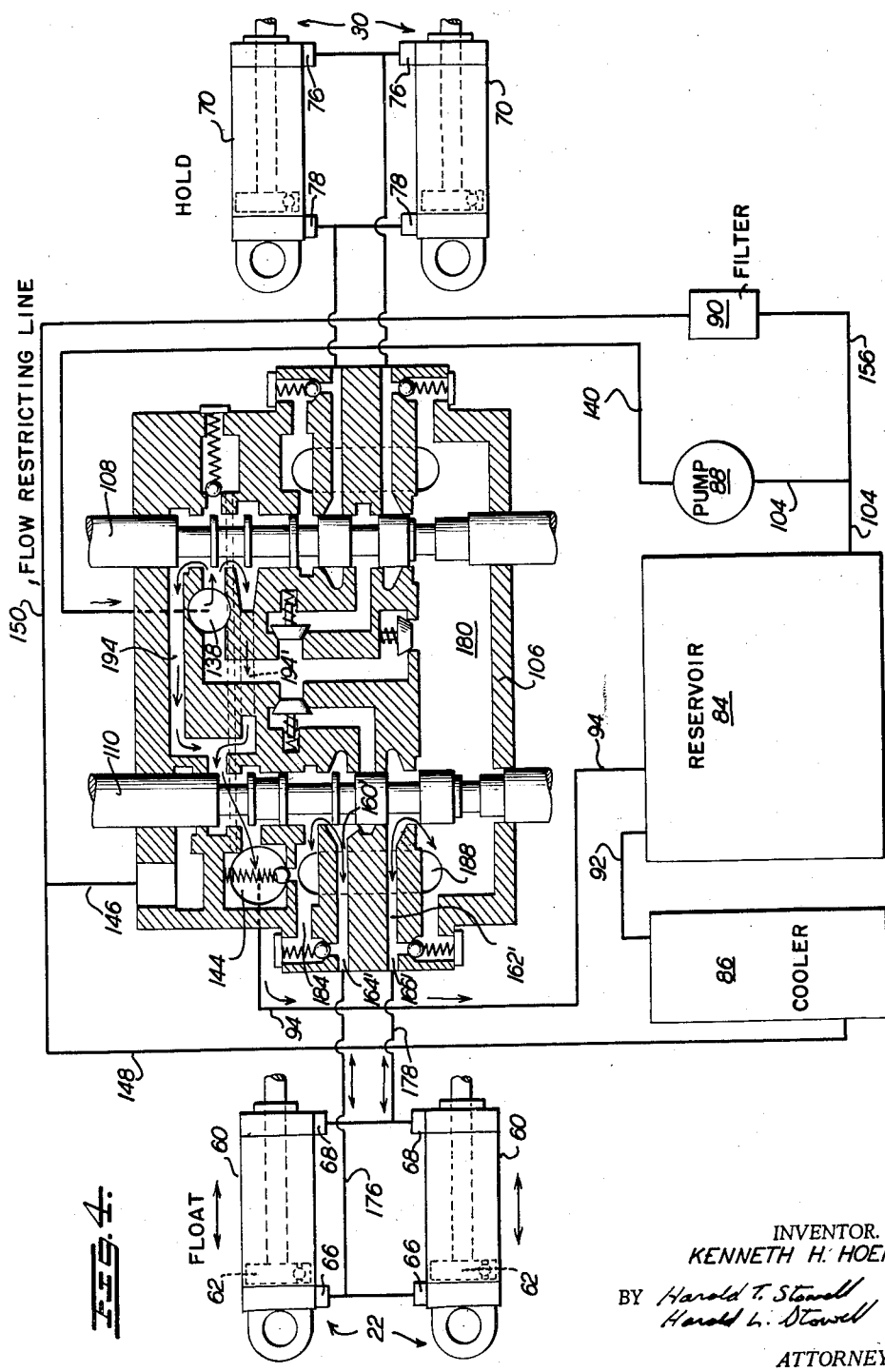

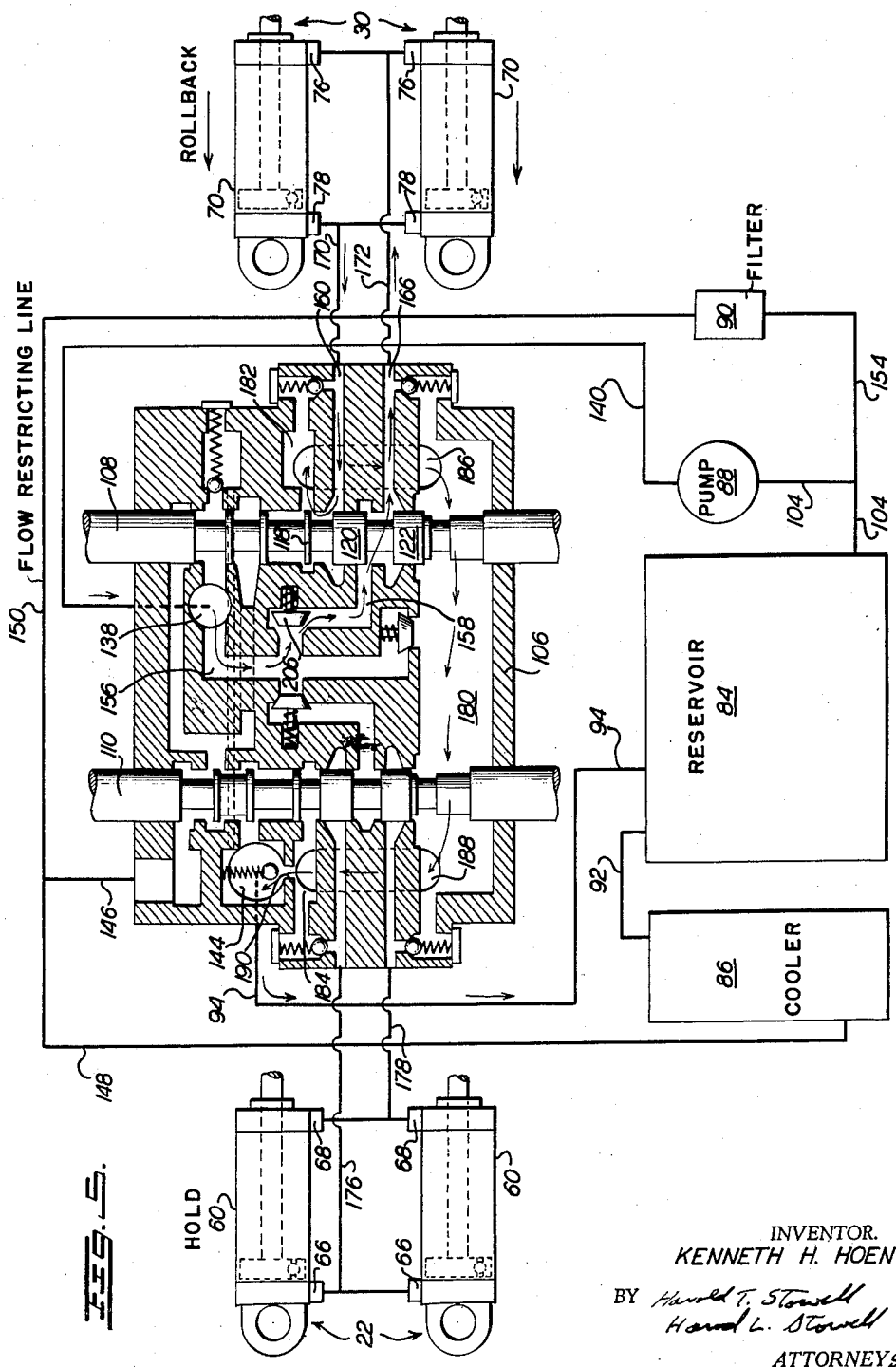

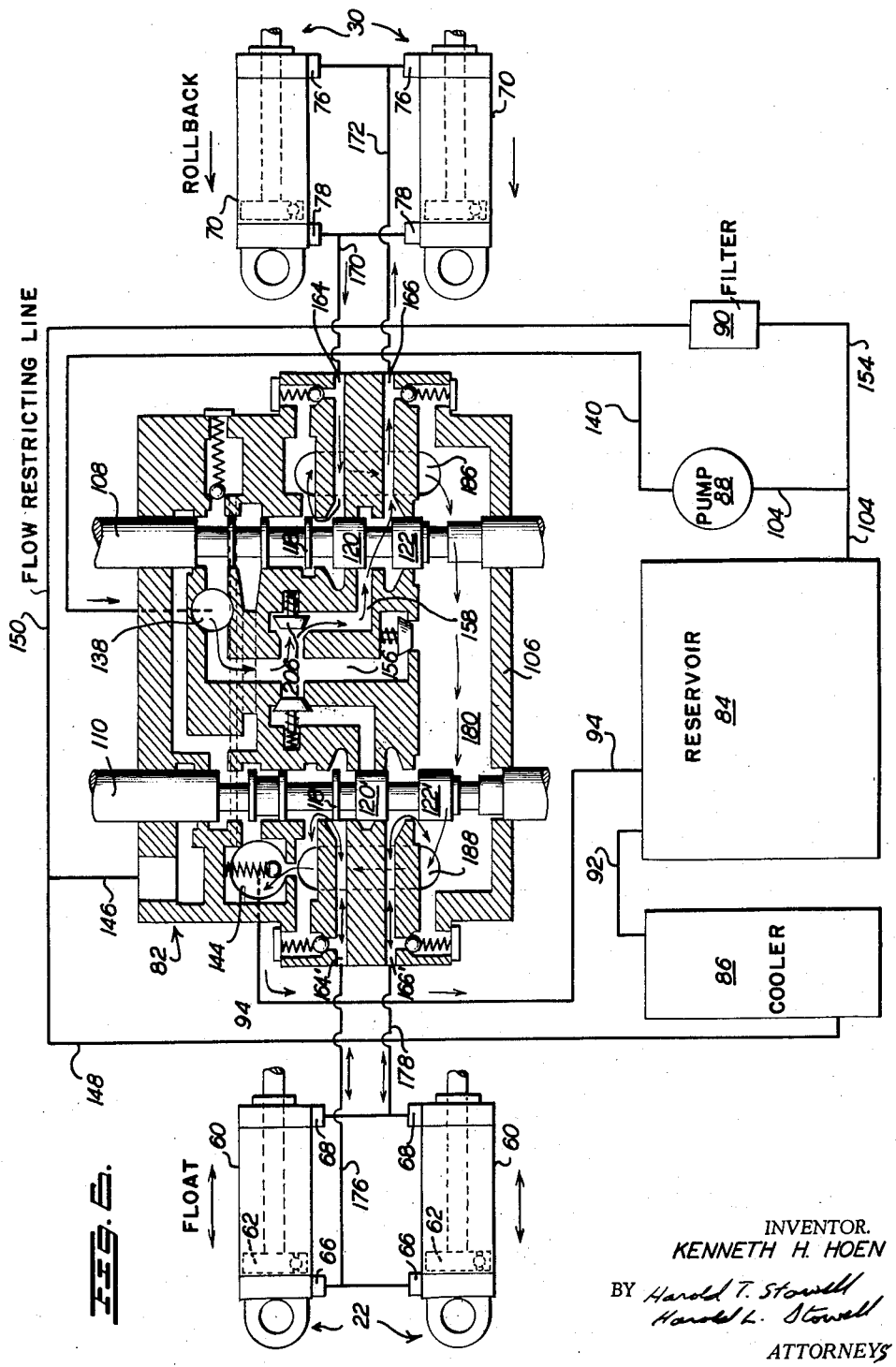

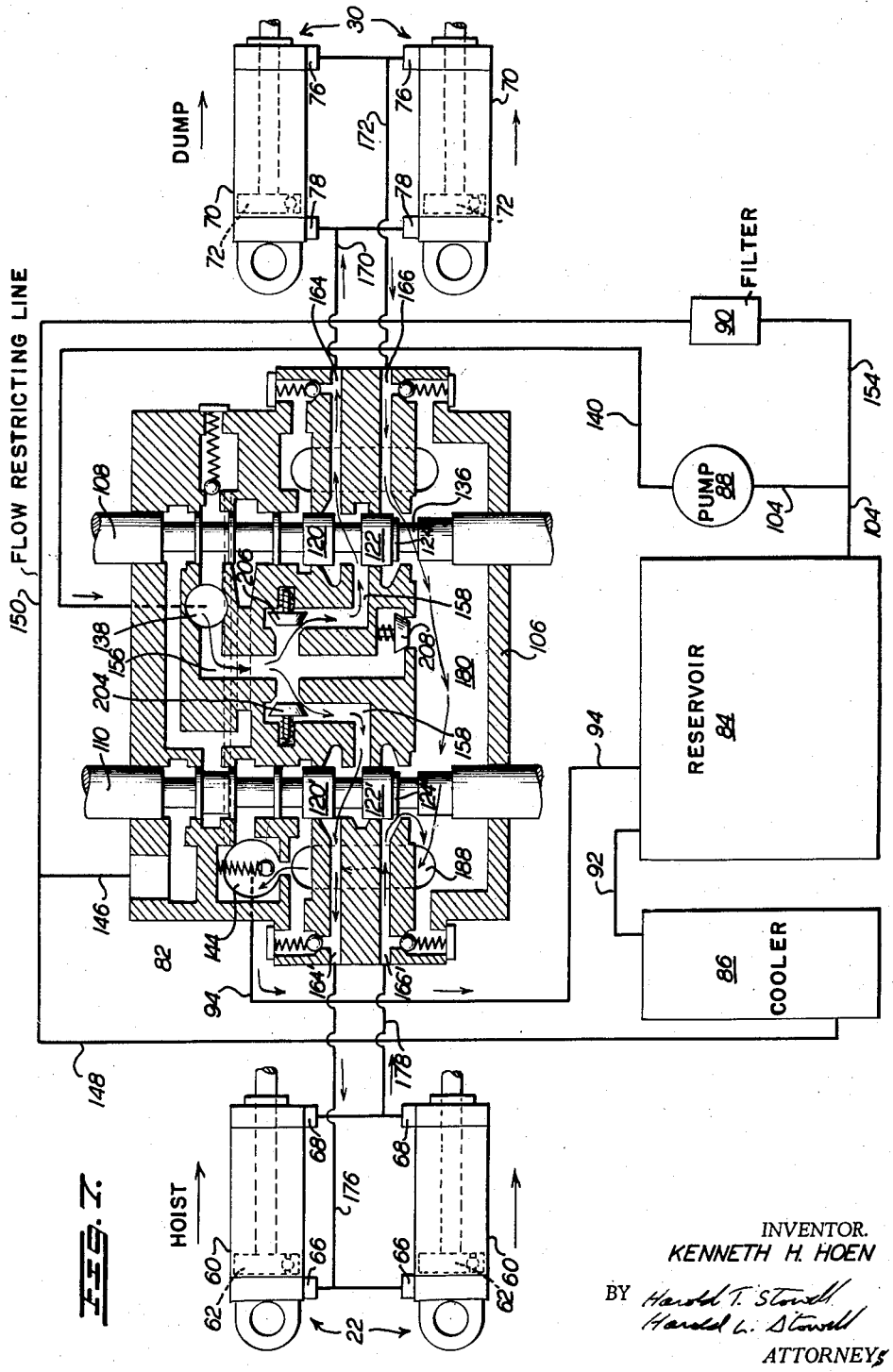

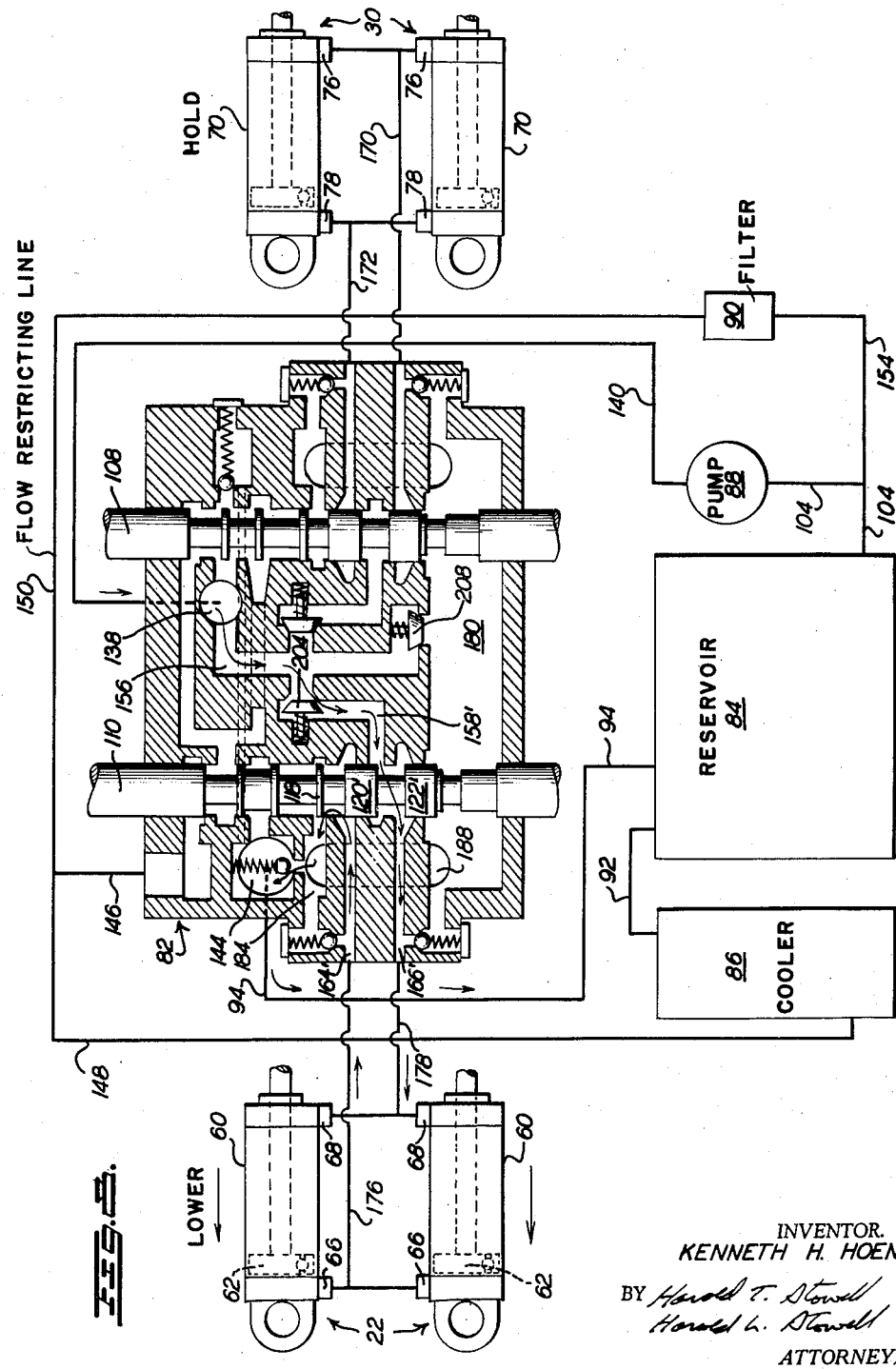

United States Patent Office 2,986,166
Patented May 30, 1961

2,986,166

PRESSURE FLUID CONTROL SYSTEM

Kenneth H. Hoen, Salt Lake City, Utah, assignor to The Eimco Corporation, Salt Lake City, Utah, a corporation of Delaware Filed Feb. 13, 1959, Ser. No. 793,131

6 Claims. (Cl. 137—622)

This invention relates to a pressure fluid control system and, more particularly, to a system wherein plural motion devices are operable simultaneously or selectively from a single source of pressure fluid.

It is an object of the present invention to provide a pressure fluid control system for plural motion devices wherein each of the motion devices is connected to a control valve having selectably movable valve spools for each of the motion devices.

A further object is to provide such a system including check valves for maintaining the motion devices at their instantaneous positions upon failure of the source of pressure fluid; and further check valves preventing overloads in the system.

A further object is to provide a pressure fluid control system including pressure responsive means for directing exhaust fluid into the pressure fluid lines.

A further object is to provide such a system for control of plural motion devices having a manually movable valve spool for each motion device wherein the flow of pressure fluid is serially about each of the manually shiftable spool means in passing from the inlet port to the exhaust port.

The invention will be more particularly described and other objects and advantages of the system will become apparent from a detailed description of the invention as applied to a front end loading device for a mobile material handling machine having two motion devices operable simultaneously or selectively which includes a source of pressure fluid; a valve body having an inlet port connected by conduit means to the source of pressure fluid, a chamber in the valve body having communication with the inlet port; an exhaust port in the valve body; pressure fluid outlet and return ports in the valve body for each of the motion devices; internal passages in the valve body connecting the chamber with the outlet and return ports; a manually shiftable spool means for each of the motion devices for selectively controlling the flow of pressure fluid from the chamber to the outlet ports, and the return ports to the exhaust port through the internal passages; internal exhaust passages connecting the exhaust port with the chamber; and pressure responsive valve means in the internal exhaust passages preventing flow of pressure fluid from the chamber to the exhaust port.

The principles of the invention will be more readily apparent to those skilled in the art from the following detailed description and the accompanying drawings wherein:

Fig. 1 is a side elevational view of a front end loading machine incorporating the features of the invention;

Fig. 1A is an enlarged detailed sectional view of the valve for operation of the plural motion devices; and Figs. 2 through 8 are diagrammatic views of the hydraulic control system of the present invention with the valve means in various operating positions.

Referring to Fig. 1 of the drawings, 10 generally designates a mobile material handling machine mounted on conventional crawler treads 12. The material handling machine includes a front end loading structure having a boom 14 which is pivotally mounted at 16 to the superstructure of the vehicle. At the other end of the boom 14 is a shovel bucket 18 which is pivotally mounted to the boom as at 20. The boom is pivoted from its low forward position shown in solid line to an upwardly extended position as shown in dotted lines by a hydraulic ram or cylinder 22.

The hydraulic ram 22 is pivotally mounted to the main frame of the vehicle as at 24 while the extended end of piston rod 26 of the ram is pivotally connected as at 28 to the boom 14 below the boom's pivotal connection to the frame of the vehicle.

The front end loading structure also includes means for pivoting the bucket 18. The means for pivoting the bucket includes a hydraulic ram 30 which is pivotally connected to the frame of the vehicle as at 32 and to a bell-crank 34 by pivot pin 26. The bell-crank is also pivoted as at 38 to the boom 14, and to an arm 40 as at 42.

The other end of the arm 40 is center connected as at 44 to a cross-arm 46. One end of the cross-arm is pivoted as at 48 to the boom 14 while the other end is pivotally mounted to a linkage 50, the lower end of which is pivoted as at 52 to the bucket 18 at a point spaced from the pivotal connection 20 of the bucket to the boom 14.

An identical system of boom, lever arms, bell-cranks, linkages, and hydraulic rams is provided for the other side of the material handling machine, as is well known in the art, whereby upon directing pressure fluid into the hydraulic rams 22 the booms 14 are pivoted about the axes of pivot shafts 16 and raised to the extended position as shown in dotted lines in Fig. 1 of the drawings. By directing pressure fluid to the hydraulic rams 30, the bucket 18 is pivoted about the axes of pivot shafts 20 for scooping material, when the arm is in the low position as shown in solid lines, or for dumping the bucket as shown in phantom lines when the boom is in the extended upwardly directed position.

The control means for actuating the pair of hydraulic rams 22 and the pair of hydraulic rams 30 will be described with reference to Figs. 1A through 8 with reference numerals corresponding to those of Fig. 1.

Referring to Figs. 2 through 8, the hydraulic rams 22 for the booms 14 include cylinders 60 having pistons 62 slidably mounted therein, piston rods 64, and pressure fluid inlet and outlet ports 66 and 68 at the extended ends of the cylinders. Each of the pistons 62 is also provided with relief valves 62' so that when a piston reaches the end of its stroke, pressure is relieved past the piston and the motion of the piston is stopped. The relief valves 62' are known in the art and form no part of the present invention.

The hydraulic rams 30 for pivoting bucket 18 include cylinders 70 provided with pistons 72 slidably mounted therein, piston rods 74 and inlet and/or outlet ports 76 and 78. Each of the pistons 72 of the hydraulic rams 30 includes a relief valve 72' as discussed with reference to the relief valves 61' of hydraulic rams 22.

The hoist rams 22 and the bucket dump rams 30 are connected to a control valve 82. The system also includes a reservoir for hydraulic fluid 84, a cooler for hydraulic fluid 86, a pump 88 and a filter 90.

Referring particularly to the reservoir 84 for the hydraulic fluid, it will be seen that the reservoir includes a return line 92 from the cooler 86 and a return line 94 from valve 82. Hydraulic fluid leaves the reservoir 84 through a conduit 104.

CONTROL VALVE

The control valve 82 for the hoist cylinders 22 and the dump cylinders 30 includes a valve body 106 having mounted therein a manually movable spool 108 controlling the flow of pressure fluid to and from the dump cylinders 30 and the flow of pressure fluid to exhaust and a valve spool 110 for controlling the flow of pressure fluid to and from the hoist cylinders 22 and the flow of pressure fluid to exhaust. Spool 108 includes the following lands and grooves; lands 112, 114, 116, 118, 120, 122, and sub-land 124; and grooves 126, 128, 130, 132, 134, and 136. Spool 110, which may be identical with spool 108, includes the following lands and grooves; lands 112', 114', 116', 118', 120', 122', and sub-land 124'; and grooves 126', 128', 130', 132', 134' and 136'.

The valve is provided with an inlet port 138 which is connected to the outlet side of pump 88 by pressure fluid conduit 140. Outlets from the valve include exhaust ports 142 and 144. Exhaust port 142 has connected thereto a return line 146 which connects with return line 148 which is connected to the inlet side of the oil cooler 86. Return line 146 also communicates with a flow restricting line 150 which connects to the inlet of filter 90 whereby a predetermined portion of the pressure fluid issuing from exhaust port 142 is passed through the filter 90; thence by conduit 154 to the inlet side of the pump 88. Exhaust port 144 is directly connected to the pressure fluid storage tank 84 by return line 94.

Pressure fluid inlet port 138 communicates directly with a chamber 156 which chamber directs pressure fluid to plural internal passages designated 158, 160 and 162 for directing pressure fluid from the chamber 156 to outlet and return ports 164 and 166.

Chamber 156 also communicates with internal passages 158', 160' and 162' which passages communicate with outlet and return ports 164' and 166' for directing pressure fluid to and from the hoist cylinders 22.

Outlet and/or return port 164 is connected to the cylinder ports 78 of rams 30 by conduits 170. The other ports 76 of cylinders 70 are connected to outlet or return port 166 by conduits 172. Similarly, parts 66 of cylinders 60 are connected to outlet or return port 164' by conduits 176 while cylinder ports 68 are connected to outlet and/or return port 166' by conduits 178.

The valve 82 is provided with the following internal passageways for return pressure fluid: common passageway 180 for both valve spools 108 and 110; return passageway 182 for valve spool 108; and return passageway 184 for valve spool 110. Passageways 182 and 184 are interconnected through common passageway 180 and passages 186 and 188. Passageway 184 is connected to the exhaust outlet 144 by return passageway 190 which passageway may be provided with a spring urged ball check valve 192 to prevent the flow of fluid from the exhaust outlet 144 into the return passageways 184 and those connected thereto while the flow of exhaust pressure fluid from the passageway 184 through passageway 190 is substantially unrestricted once the pressure differential between the outlet 144 and the passage 190 and the resilience of the spring of the spring-urged ball check 192 are overcome.

The valve 82 is also provided with internal bypass passageways 194, 194' and 196 which connect the pressure fluid inlet port 138 to outlets 142 and 144 as to be more fully described hereinafter. There is also provided a relief passage 198 which interconnects passage 200 and the exhaust port 144. The flow of pressure fluid in the passage 198 is controlled by a spring urged ball check relief valve 202, which is preset at the time the valve is manufactured, for maximum pressure conditions and under overload conditions will permit passage of the pressure fluid from the inlet 138 of the valve to the tank 84 via exhaust port 144 and return line 94.

Chamber 156 is provided with three pressure responsive flow control valves designated 204, 206 and 208. Flow control valve 204 is positioned between internal passageway 158' and chamber 156; pressure responsive valve 206 is positioned between passageway 158 and chamber 156; and pressure responsive flow control valve 208 is positioned between return passageway 180 and chamber 156. Flow control valves 204 and 206 are responsive to pressure differential between the chamber 156 and their respective passageways 158 and 158' to permit flow of pressure fluid from the chamber 156 to the passages while preventing flow of pressure fluid from passages 158 or 158' to the chamber 156, thus preventing the shovel bucket from dumping or the lift arms from dropping due to lack of pressure between the pump 88 and the control valve 82 if, for example, the engine driving the pump 88 should fail during operation of the material handling machine.

Flow control valve 208 which is responsive to pressure differential between the common passageway 180 and the chamber 156 permits the flow of pressure fluid from the passage 180 into the chamber 156 when the pressure in the passage 180 exceeds the pressure in the chamber 156 by a predetermined amount, thereby preventing starving of one or more of the hydraulic cylinders 22 or 30 during operation of the material handling machine as to be more fully described hereinafter.

To complete the control valve assembly, the valve is provided with four spring-urged ball checks designated 210, 212, 214 and 216. These ball check type relief valves protect the hydraulic lines from the cylinders, and valve spools and the like from excessive pressures and surges caused by shock loads and impact. It will be seen that each of the internal passageways 160, 162, 160' and 162' is each provided with one of the relief valves. Thus, for example, if a momentary overload should develop, in internal passage 160' or in lines 176 connecting the outlet port 164' for the internal passage 160' to the inlet ports 66 of cylinders 60, when the hoist cylinders are lifting the loaded bucket, the excessive pressure would force the ball of ball check relief valve 214 away from its seat and pressure fluid would flow from the internal passage 160' into the return passage 190 to exhaust port 144 until the overload condition is relieved. The other ball check type relief valves 210, 212 and 216 function in a similar manner.

Valve spool 110 controlling the hoist cylinders 22 is a four-position spool and for the purposes of the illustrative embodiments of the invention the four positions will be designated:

(1) "Blocked" whereby pressure fluid is blocked from flowing to and from the cylinders as shown in Figs. 2 and 5.

(2) "Hoist" whereby the bucket is lifted and hydraulic fluid flows to the cylinders via conduits 176 and returns to the valve via the conduits 178 as shown in Figs. 3 and 7.

(3) "Float" whereby the pistons may move in either direction within the cylinders 60 of hydraulic rams 22 as shown in Figs. 4 and 6.

(4) "Lower" whereby the booms supporting the bucket are lowered from their elevated positions and hydraulic fluid is directed to the cylinders through conduits 178 and returned to the valve from the cylinders by conduits 176 as shown in Fig. 8.

For the purposes of illustration, value spool 108 for the dump cylinders is of the three-position type which will be generally designated:

(1) "Hold" whereby the pistons are maintained in a predetermined position and there is no flow of pressure fluid in conduits 170 and 172 as shown in Figs. 2, 3, 4 and 8.

(2) "Rollback" whereby pressure fluid is directed to the cylinders by conduits 172 and pressure fluid is directed from the cylinders by conduits 170 as shown in Figs. 5 and 6.

(3) "Dump" wherein pressure fluid is directed to the dump cylinders through conduits 170 and pressure fluid from the cylinders is returned to the valve through the conduits 172 as shown in Fig. 7.

Operation

Referring specifically to Fig. 2 of the drawings, both of the valve spools 108 and 110 are positioned in the "hold" position. With the pump 88 operating, pressure fluid is directed from the reservoir 84 to the pump through conduit 104 and to the inlet port 138 of valve 82 through conduit 140. With the spool 108 in the "hold" position, land 120 blocks passage of pressure fluid to port 164; land 122 blocks flow of pressure fluid through port 166; and lands 120 and 118 block the flow of pressure fluid through passageway 182 and spring-urged control valve 208 prevents the flow of pressure fluid to passageway 180. Now, referring to valve spool 110 as shown specifically in Fig. 2 of the drawings, land 120' prevents flow of pressure fluid through port 164'; land 122' prevents flow of pressure fluid from port 166'; and lands 120' and 118' prevent the flow of pressure fluid to passageway 184. Therefore, the pressure fluid entering valve 82 through inlet 138 flows past lands 114 and 116 of spool 108; thence through bypass passageways 194 and 194'; past lands 114' and 116' of spool 110 and out of exhaust ports 142 and 144. The pressure fluid flowing from exhaust port 144 passes to tank 84 via conduit 94. Of the pressure fluid flowing from exhaust port 142, a portion of the pressure fluid entering conduit 146 flows down the conduit 148 through the hydraulic fluid cooler 86 and into the reservoir through conduit 92. A further portion of the pressure fluid entering conduit 146 flows through the restricted conduit 150 to the filter 90 and from the filter 90 to the pump via lines 154 and conduit 104.

In the preferred arrangement of the valve with the spools in the "hold" position aproximately one-half of the pump delivery goes through port 142, conduits 146 and conduit 148 to the cooler 86 with a small portion thereof passing through the restricted conduit 150 to the filter 90. The remainder of the flow of pressure fluid passes out port 144 and to the reservoir 84 through conduit 94. Where desired the groove 128' of spool 110 may be shallower than the corresponding groove 128 of spool 108 whereby the restriction of bypass fluid flow to and through exhaust port 144 will be more suitably balanced to the restriction of bypass fluid flow to and through exhaust port 142 as illustrated in the drawings. This division of flow results from the position of lands 114' and 116' of spool 110 and the back pressure created in the conduits 146, 148, 150, and 94.

When the hydraulic fluid is cold and both of the valves are in the "hold" position as shown in Fig. 2, the majority of the hydraulic fluid will automatically bypass the cooler until it has warmed up to a point to where its viscosity is decreased and cooling of the oil is necessary.

As will be more clearly apparent from the further description of the operation of the system of the invention when either valve spool 108 or 110 is shifted to a working position flow of pressure fluid to the cooler and/or to the filter 90 is blocked and no hydraulic fluid passes to these structures. Accordingly, when pressure fluid is required to operate the cylinders 22 or 30 there is no loss of power through the cooler or through the filter and it has been found that sufficient cooling of the hydraulic fluid is obtained when the valves are in the "hold" position which takes place regularly during the working cycle of the machine.

Referring to Fig. 3 of the drawings, valve spool 108 controlling the flow of pressure fluid to the dump cylinders 30 is shown in the "hold" position while valve spool 110 which controls the flow of pressure fluid to the hoist cylinders 22 is in the "hoist" position. With the valve spools in these positions, pressure fluid from the pump 88 flows through conduit 140 to the inlet port 138 and into chamber 156. Pressure fluid from chamber 156 of the valve 82 flows past the spring-urged valve check 204 to passage 158' and between spool lands 120' and 122' to passage 160', thence through conduit 176 to ports 66 of rams 22 forcing the pistons and their piston rods in the direction of the directional arrows. Hydraulic fluid ahead of the pistons 62 flows out of ports 68 through conduit 178 into the valve 82 through port 166' into passage 162' by lands 122' and 124' about groove 136' into passages 180 and 188, thence out exhaust port 144 into conduit 94 through which the hydraulic fluid is returned to the reservoir 84. It will be noted that when valve spool 110 is in the "hoist" position spool land 114' blocks the passage of pressure fluid to valve port 142 so that no pressure fluid flows to the cooler or the filter and land 116' blocks the passage of pressure fluid directly from the inlet port 138 to exhaust port 144.

It will be noted with respect to spool 108 that while lands 120 and 122 are blocking flow of pressure fluid in internal passages 160 and 162, lands 114 and 116 do not prevent the flow of pressure fluid in internal passages 194 and 194' and if overload conditions arise, spring-urged check valve 202 will open permitting excess pressure fluid to enter passage 200 and flow through bypass passage 198 to the exhaust outlet 144. It will also be noted in the other positions, rollback and dump, of the spool 108 pressure fluid from the inlet 138 is also in communication with the ball check 202.

Referring to Fig. 4 of the drawings, valve spool 108 is also in the "hold" position while valve spool 110 is in the "float" position. With valve spool 110 in the "float" position, the primary flow of pressure fluid through this valve is out the exhaust port 144 into conduit 94 through which it is returned to the reservoir 84. However, it will also be noted that conduits 176 and 178 which are connected to ports 164' and 166' of the valve are opened to the flow of hydraulic fluid returning to the reservoir 84 through internal passages 184, 160', 162', 180 and 188 in the valve whereby pressure fluid may flow in either direction in conduits 176 or 178 to either side of the pistons 62 of hydraulic rams 22 whereby the boom may seek the level of the ground and as the ground level shifts the boom and the bucket ride upwardly or downwardly, without the application of positive force in either direction. With the valve spool 110 in the "float" position the front end loading machine is available for use in smoothing a surface which is being worked and the like.

Referring specifically to Fig. 5 of the drawings, valve spool 108 is shown in the bucket "rollback" position and valve spool 110 is shown in the "hold" position. With valve spool 108 in the "rollback" position, all of the pressure fluid from pump 88 passes through chamber 156 past spring-urged control member 206, between spool control lands 120 and 122, thence out valve port 166 into conduits 172 to inlet ports 76 of hydraulic rams 30 forcing the pistons in the direction of the directional arrows. Hydraulic fluid at the rear ends of the hydraulic rams 30 leaves the cylinders through ports 78, conduits 170 to port 160 of the valve. From port 160 the return fluid flows between control lands 118 and 120 of spool 108 through passages 182, 186, 180, 188, 184, and 190 thence out port 144 and into conduit 94 through which the hydraulic fluid is returned to the reservoir 84.

Referring specifically to Fig. 6 of the drawings, valve spool 108 is in the "rollback" position and valve spool 110 is in the "float" position. With the valve spools in these positions, pressure fluid leaving pump 88 flows through conduit 140 to inlet port 138 of the valve 82. From inlet port 138 of valve 82 the pressure fluid passes the spring-urged valve means 206 and all of the hydraulic fluid flows between spool control lands 120 and 122, thence out of valve port 166 through conduits 172 to the forward ends of hydraulic rams 30 moving the pistons thereof in the direction of the directional arrows. The hydraulic fluid at the rearward ends of the pistons leaves the cylinders through ports 78, conduits 170 to the valve through valve port 164 and past spool control lands 120 and 118, thence out valve port 144 to reservoir 84 through conduit 94. While none of the pressure fluid flows from chamber 156 past spool 110 to rams 22, pressure fluid from either end of pistons 62 of hydraulic rams 22 may flow in conduits 176 and 178 about spool control surfaces 118', 120', and 122', as described with reference to Fig. 4 of the drawings.

Referring specifically to Fig. 7 of the drawings, valve spool 108 is in the "dump" position and valve spool 110 is in the "hoist" position. With the valve spools in these positions, pressure fluid from the pump 88 flows through conduit 140 into inlet port 138 of the valve. Pressure fluid entering port 138 flows to chamber 156 where a portion thereof flows past the spring-urged flow control valve 206 and between spool lands 120 and 122 to outlet port 164, thence into conduits 170 to inlet ports 78 of hydraulic rams 30 forcing the pistons in the direction of the directional arrows. Hydraulic fluid ahead of the pistons 72 flows out of the cylinders through ports 76 into conduits 172, thence to inlet port 166 of valve 82 about spool control lands 122 and 124, thence out port 144 to conduit 94 which directs the return pressure fluid to the reservoir 84.

The other portion of the pressure fluid flows past the spring-urged control valve 204 and between spool control lands 120' and 122', thence out of port 164' and into conduits 176 to the rearward ends of hydraulic rams 22 forcing the pistons 62 in the direction of the directional arrows. Hydraulic fluid ahead of the pistons 62 leaves the cylinders through ports 68 to flow into conduits 178 to inlet port 166' of valve 82 where the fluid flows about spool control lands 122' and 124', thence out port 144 to conduit 94 where it is returned to the reservoir 84.

With both valve spools 108 and 110 in a working position as shown in Fig. 7, the pressure required to operate the hoist hydraulic rams 22 may be greater than that required to operate the dump hydraulic rams 30. If this condition arises and there is sufficient pressure fluid to operate the hoist rams while the dump rams are being actuated spring-urged flow control valve 204 will close preventing the bucket arm or boom 14 from dropping. The flow control valve 204 will remain in the closed position until sufficient pressure is built up within the system to operate the hoist rams 22.

Referring specifically to Fig. 8 of the drawings, valve spool 110 is in the bucket "lowering" position and valve spool 108 is in the "hold" position. With the valve spools in these positions, pressure fluid from pump 88 flows through conduit 140 to inlet port 138 to chamber 156. From chamber 156 pressure fluid flows past the spring-urged control valve 204 to passageway 158' then between spool control lands 120' and 122', hence through port 166' to conduits 178 where the pressure fluid is directed into inlet ports 68 of hydraulic rams 22 moving the pistons 62 in the direction of the directional arrows.

Hydraulic fluid at the rear of the pistons flows out of ports 66 through conduits 176 to inlet port 164' of valve 82, thence between spool control lands 120' and 118', thence out port 144 and into conduit 94 which returns the hydraulic fluid to the reservoir 84.

When the bucket is being lowered as shown in Fig. 8 of the drawings, the load carried by the bucket may be great enough to cause the arm 14 to drop faster than the pump supply would normally allow. Under these conditions spring-urged flow control valve 208 will open permitting make-up hydraulic fluid to enter the system from return conduits 184, 188 and 180, thus preventing cavitation.

Similarly, with reference to Fig. 7, if the dump cylinder should move faster than the pump supply would normally allow due to a particularly heavy load in the bucket pulling the dump cylinders over, make-up hydraulic fluid will be drawn into the system from the return side of the cylinders through spring-urged flow control valve 208 from internal return passageway 180.

It is further pointed out that spring-urged flow control valve 206 functions to prevent the bucket from dumping due to lack of pressure between the pump and the control valve if the engine driving the pump 88 should fail when the valve spool 108 is in the "rollback" position and the bucket is up and loaded.

I claim:

1. A pressure fluid control system for plural motion devices operable simultaneously or selectively comprising a valve body; said valve body having an inlet port for pressure fluid; a chamber in said valve body having communication with the inlet port; an exhaust port in the valve body; a plurality of pairs of pressure fluid outlet or return ports in said valve body; internal passages in the valve body connecting said chamber with the outlet and return ports; a shiftable flow control spool means for each of said pairs of ports for selectively controlling the flow of pressure fluid from the chamber to either port of each said pairs of ports, and from the other port of each of said pairs of ports to the exhaust port through the internal passages; internal return passages connecting the exhaust port with the chamber; and valve means in said internal return passages responsive to pressure differential between said return passages and said chamber to permit flow of pressure fluid from said return passages to said chamber when the pressure in said return passages exceeds the pressure in said chamber by a predetermined amount.

2. The invention defined in claim 1 including internal bypass passages connecting said inlet port and the exhaust port wherein the flow of pressure fluid from the inlet to the exhaust port through the internal bypass passages is serially about each of the shiftable flow control spool means.

3. The invention defined in claim 1 including further pressure responsive valve means between the internal passages and said chamber preventing flow of pressure fluid from the outlet and return ports to said chamber.

4. The invention defined in claim 1 including overload relief valves operable to divert the flow of pressure fluid in said internal passages to said exhaust port.

5. The invention defined in claim 1 including pressure responsive flow directing means in said chamber preventing the flow of pressure fluid from said internal passages to said chamber upon a predetermined reduction in the pressure of the pressure fluid between the source of pressure fluid and said chamber.

6. A pressure fluid control system for plural motion devices operable simultaneously or selectively comprising a valve body; said valve body having an inlet port for pressure fluid; a chamber in said valve body having communication with the inlet port; an exhaust port in the valve body; a plurality of pairs of pressure fluid outlet or return ports in said valve body; internal passages in the valve body connecting said chamber with the outlet and return ports; a shiftable flow control spool means for each of said pairs of ports for selectively controlling the flow of pressure fluid from the chamber to either port of each of said pairs of ports, and from the other port of each of said pairs of ports to the exhaust port through the internal passages; internal return passages connecting the exhaust port with the chamber; internal bypass passages connecting said inlet port and said exhaust port; said spool means selectively controlling the flow of pressure fluid through said internal bypass passages; and pressure responsive flow directing means in said chamber preventing the flow of pressure fluid from said internal passages to said chamber upon a predetermined reduction in the pressure of the pressure fluid between the source of pressure fluid and said chamber.

References Cited in the file of this patent

UNITED STATES PATENTS

| | | |
|---|---|---|
| 2,232,357 | Argo | Feb. 18, 1941 |
| 2,247,141 | Twyman | June 24, 1941 |
| 2,705,971 | Dorkins | Apr. 12, 1955 |
| 2,857,009 | Adams et al. | Oct. 21, 1958 |